(12) United States Patent
Specht et al.

(10) Patent No.: US 6,719,233 B2
(45) Date of Patent: Apr. 13, 2004

(54) SEAT BELT RETRACTOR WITH LOAD LIMITER

(75) Inventors: Martin Specht, Feldafing (DE); Thomas Heckmayr, Rammingen (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 27 days.

(21) Appl. No.: 10/217,416

(22) Filed: Aug. 14, 2002

(65) Prior Publication Data

US 2003/0094533 A1 May 22, 2003

(30) Foreign Application Priority Data

Nov. 20, 2001 (DE) .......................... 101 56 825

(51) Int. Cl.[7] .............................................. B60R 22/28
(52) U.S. Cl. ...................... 242/379.1; 242/381; 280/805
(58) Field of Search ................................ 242/379.1, 381; 280/805, 806; 297/470, 471, 472; 188/267.1, 267.2, 275, 280

(56) References Cited

U.S. PATENT DOCUMENTS

| | | | |
|---|---|---|---|
| 2,820,471 A | * 1/1958 | Crowell | 188/267.2 |
| 2,877,872 A | * 3/1959 | Krizan | 188/275 |
| 3,178,136 A | 4/1965 | Bayer | 244/122 |
| 3,178,225 A | * 4/1965 | Bayer | 297/470 |
| 3,881,687 A | * 5/1975 | Tandetke | 242/379.1 |
| 5,533,597 A | * 7/1996 | Nezu et al. | 188/280 |
| 6,019,392 A | * 2/2000 | Karlow | 280/806 |
| 6,129,385 A | * 10/2000 | Blackadder | 280/805 |
| 6,206,421 B1 | * 3/2001 | Schremmer | 188/280 |
| 6,209,916 B1 | * 4/2001 | Smithson et al. | 280/805 |
| 6,237,959 B1 | * 5/2001 | Hishon | 242/381 |
| 6,290,159 B1 | 9/2001 | Specht et al. | 242/379.1 |
| 6,345,705 B1 | * 2/2002 | Tremblay | 188/275 |

FOREIGN PATENT DOCUMENTS

JP   2001026252   1/2001

* cited by examiner

*Primary Examiner*—John M. Jillions
(74) *Attorney, Agent, or Firm*—Lonnie Drayer (57) ABSTRACT

A seat belt retractor has a belt reel for seat belt webbing and a load limiter that has a flowable load-limiter medium which is transported through a flow channel, by a displacement device. The displacement device is drivable by the belt reel, at an energy consumption related to a crash, in which the flow resistance of the transported load-limiter medium in the flow channel or the volume of the load-limiter medium transported in the flow channel per unit time is adjustable.

18 Claims, 7 Drawing Sheets

SEAT BELT RETRACTOR WITH LOAD LIMITER

FIELD OF THE INVENTION

The present invention relates to a seat belt retractor having a load limiter.

DISCUSSION OF THE PRIOR ART

U.S. Pat. No. 6,290,159 B1 teaches a seat belt retractor with a load limiter having a flowable medium which is transported, by a displacement device, such as a hydraulic pump, driven by the belt webbing unwound from the belt reel, at an energy consumption related to a crash and adjusted as a function of data related to a crash. For this purpose, the cross-section of flow of the displaced or transported fluid may be adjusted by a controllable valve.

In the present invention the flow resistance of the medium transported by the displacement device is adjusted. This adjustment is preferably performed as a function of the seat position and the body weight of the vehicle occupant wearing the seat belt and affected by a crash, and by the severity of the crash. Furthermore, during the force-limiting withdrawal of the belt webbing, it is possible for a constant or characteristic-controlled belt webbing restraining force to be obtained by adjusting the flow resistance.

The flow rate of the transported medium can be adjusted and thus the desired restraining force coming from the belt webbing obtained. The corresponding flow resistance and thus the desired flow of the transported load-limiter medium through the hydraulic system of the load limiter may be achieved by a number of embodiments.

For example, a valve wherein the timing is controlled by an electronic control device and which, as a function of the input parameters relating to a crash, adjusts the through flow quantity of the transported load-limiter medium per unit time may be provided. This is achieved by the timing of opening and closing of the valve.

Furthermore, the transported medium may be countered by a counter-force that acts over the entire cross-section of the transported load-limiter medium. This counter-force counters the pressure of the transported force-limiter medium and may, for example, be in an adjustable pneumatic spring or a mechanical spring of variable spring force. As a result of this counter-force or counter-pressure, it is also possible to adjust the restraining force coming from the fastened seat belt webbing.

Furthermore, the mass flow of the transported load-limiter medium may be used as a regulating variable for the restraining force or withdrawal speed exerted by the belt webbing. In the case of a system responsive to mass flow of this kind, an element which is mounted in the flow path in opposition to a restoring force, for example a spring force, and around which the load-limiter medium flows may be provided. This element around which there is flow is moved in opposition to the restoring force by the mass flow of the transported medium, and in so doing adjusts the cross-section of flow as a function of the mass flow.

Furthermore, by altering the viscosity of the load-limiter medium the load-limiting action may be adjusted. Suitable load-limiter media are preferably electro-rheological and/or magneto-rheological fluids wherein the viscosity may be adjusted by an electrical and/or magnetic field. The displacement device may be constructed such that it transports the load-limiter medium in the manner of a hydraulic pump. Alternatively the displacement device is moved in the load-limiter medium at rest by the force exerted by the belt webbing, in which case the load-limiter medium is transported by the displacement device. The displacement device may be a rotor or a linearly movable piston.

As a result of the present invention, the space which is available for the forward displacement of the vehicle occupant wearing the seat belt is exploited for force-limited forward displacement. In the case of a vehicle occupant of high weight, therefore, the restraining force is greater than for a vehicle occupant of lower weight. In the present invention, this is achieved by an appropriate adjustment of the flow rate or the flow resistance through electronic or electrical or automatic regulation.

DETAILED DESCRIPTION OF THE INVENTION

Figure 1:
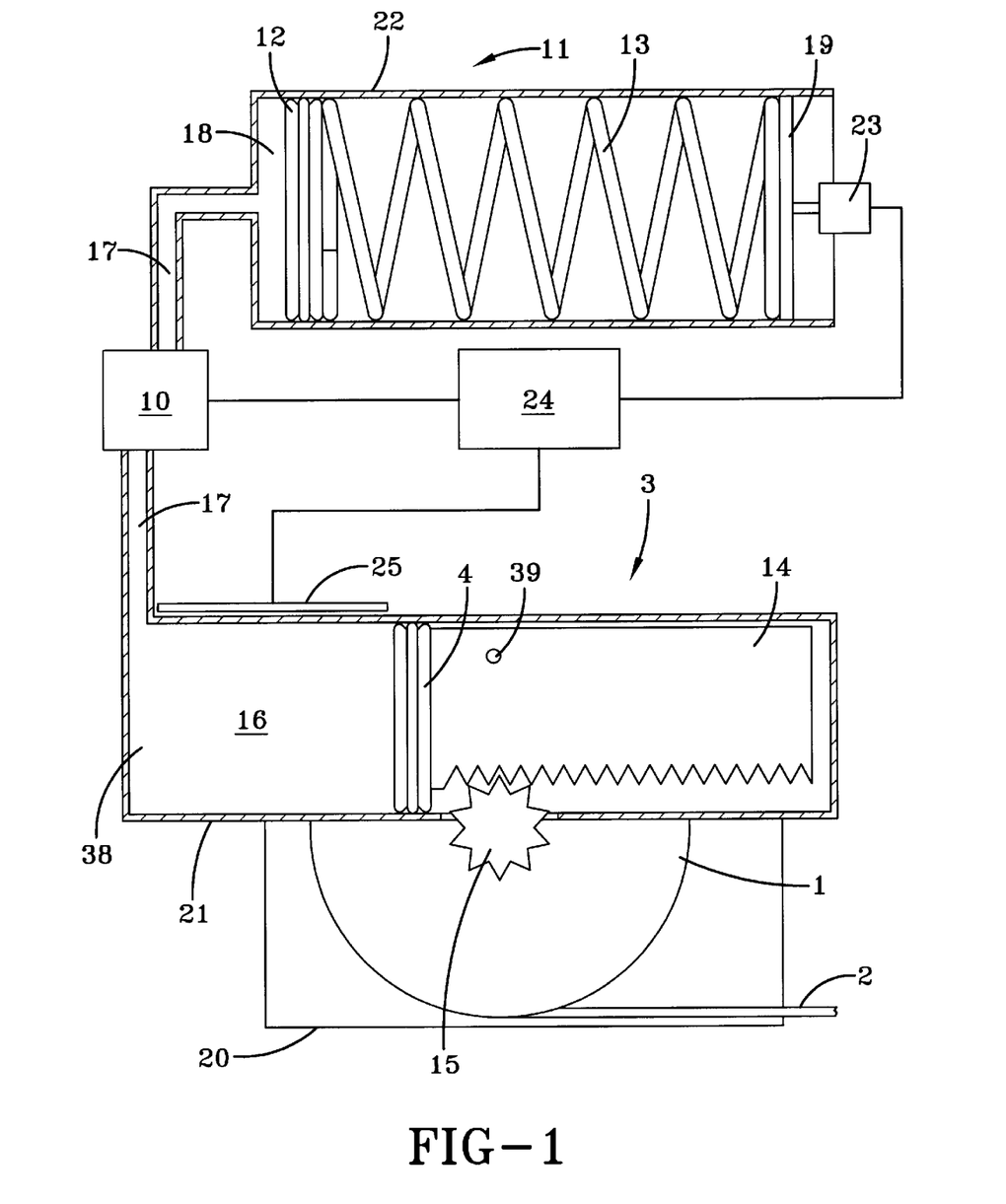
FIG. 1 is a diagrammatic representation of an exemplary embodiment of a seat belt retractor having a load limiter.

FIG. 1 shows diagrammatically a frame 20 of a seat belt retractor on which a belt reel 1 is rotatably mounted. A seat belt webbing 2 may be wound onto the belt reel 1 and unwound therefrom. To form a load limiter 3, the belt reel 1 is operatively connected with a displacement device 4 which is movable in a space closed off in pressure-tight manner, for example a cylinder 21. In the exemplary embodiment, the displacement device 4 is a piston linearly movable in the cylinder 21. The drive connection with the belt reel 1 is made by a toothed rack 14 fixedly connected to the displacement device 4. The toothed rack 14 meshes with a pinion 15 that is non-rotatably connected to the belt reel 1. Between the toothed rack and the pinion, a gear may also be provided. Instead of the linearly movable displacement device 4, it is also possible for a rotary displacement device such as a rotary piston to be provided, in drive connection with the belt reel 1 directly or by a gear. The drive connection between the belt reel 1 and the force limiter 3 ensures that in a crash if there is a forward displacement of the vehicle occupant wearing the seat belt, that there is a force-limited withdrawal of the seat belt webbing 2 from the belt reel 1.

The force-limited withdrawal of the belt webbing takes place once a certain force threshold has been exceeded. This force threshold is determined by a holding device, for example a shear pin 39. If the restraining force acting on the toothed rack 14 or the displacement device 4 through the holding device, such as the shear pin 39, is overcome by the force exerted by the belt webbing in the direction of withdrawal, the holding device is detached, that is to say the shearing pin 39 shears off and the belt webbing is withdrawn with force limitation. During this force-limiting withdrawal of the belt webbing, the displacement device 4 is driven over the belt reel 1 by the withdrawn seat belt webbing 2 and moved in the displacement space, for example the cylinder 21. This movement is performed from right to left as seen in FIG. 1. During this, the flowable force-limiter medium 16, for example a hydraulic fluid, is moved from a reservoir space 38 via a transport path 17 and an adjustment device 10 to adjust the volume of load-limiter medium 16 transported per unit time.

The force-limiter medium 16 is in this case transported into a collecting space 18. The volume of the collecting space 18 may be altered by a piston 12 displaceable in a cylinder 22, as a function of the transported volume of the force-limiter medium 16.

The force-limiting action may be adjusted as a function of data relating to a crash, by appropriate adjustment of the flow resistance of the transported force-limiter medium 16 and where necessary may be regulated while the belt webbing is being withdrawn in force-limited manner. For this purpose, in the exemplary embodiment illustrated, an adjustment device 10 for adjustment of the cross-section of flow and an adjustment device 11 for generation of a counter-force are provided. In order to adjust the force-limiting action in a manner related to a crash, both adjustment devices 10, 11 may be actuated together or one of the two adjustment devices 10, 11 may be actuated individually.

Figure 2:
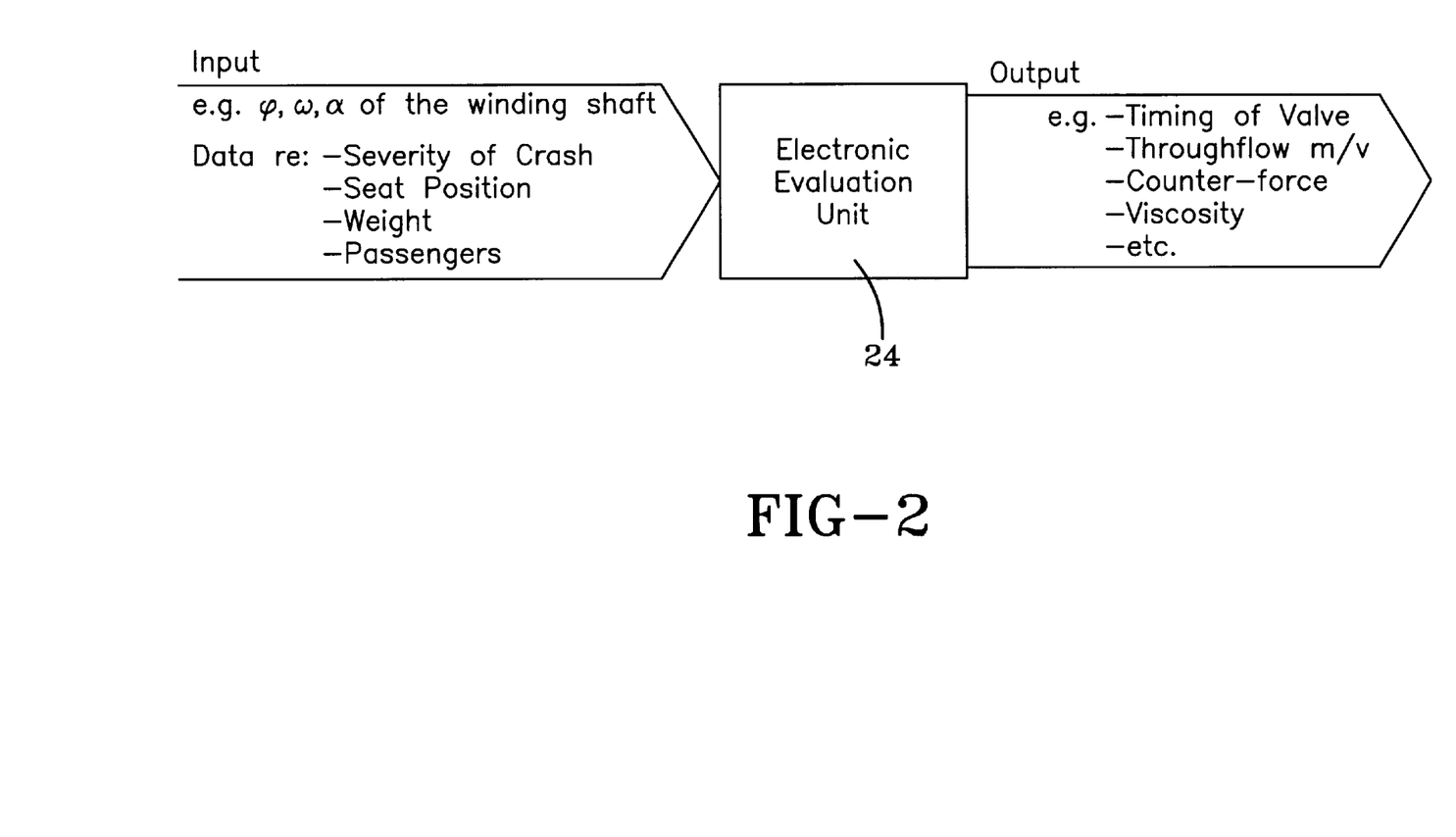
FIG. 2 is a diagrammatic representation of the control of the force-limiting action of the exemplary embodiment illustrated in FIG. 1.

The adjustment devices 10, 11 may be triggered together or, as explained, individually by an electronic evaluation unit 24. The electronic evaluation unit 24 evaluates data relating to a crash including, for example, information on the severity of the crash, the seat position and the weight of the vehicle occupant. Measurement data on the severity of the crash may be derived for example from the rotation movement of the belt reel 1, as known for example from U.S. Pat. No. 6,290,159 B1. The timing of a valve for opening and closing the cross-section of flow can be adjusted appropriately in the adjustment device 10 by the electronic evaluation device 24. Furthermore, the cross-section of opening of the valve can be adjusted. As a result, a certain rate is set at which the force-limiter medium 16 is transported from the reservoir space provided in the cylinder 21 into the collecting space 18.

Furthermore, the electronic evaluation device 24 may trigger an actuator 23, for example a solenoid or a servo motor, by which the force of a counter-pressure spring 13 is adjusted by a servo element 19. The counter-pressure spring 13 may be a mechanical spring or a pneumatic spring. The counter-pressure spring 13 acts on a counter-pressure piston 12 which delimits the collecting space 18. As a result, the flow resistance of the medium 16 transported in the load limiter 3 may be adjusted. The collecting space 18 then acts as a counter-pressure space in the cylinder 22. The actuator 23 acts on the servo element 19 by which the counter-force of the spring 13 is adjusted.

The desired flow resistance may be obtained by adjusting the cross-section of the flow channel through which the load-limiter medium is transported automatically responsive to inertia. For this purpose, an inert mass mounted in opposition to a restoring force may be arranged in the flow path and is moved as a function of the acceleration, acting in the event of a crash, in opposition to the restoring force, in particular spring force, and in this way adjusts the cross-section of flow in a manner responsive to acceleration.

FIGS. 3 to 10 illustrate further exemplary embodiments for the automatic adjustment of the cross-section of flow in the transport path 17 of the displaced force-limiter medium 16. In the exemplary embodiments of FIGS. 3 to 7 flow resistances are adjusted responsive to acceleration, and in the exemplary embodiments of FIGS. 8 to 10 the cross-sections of transport path are adjusted in a manner responsive to mass flow.

Figure 3:
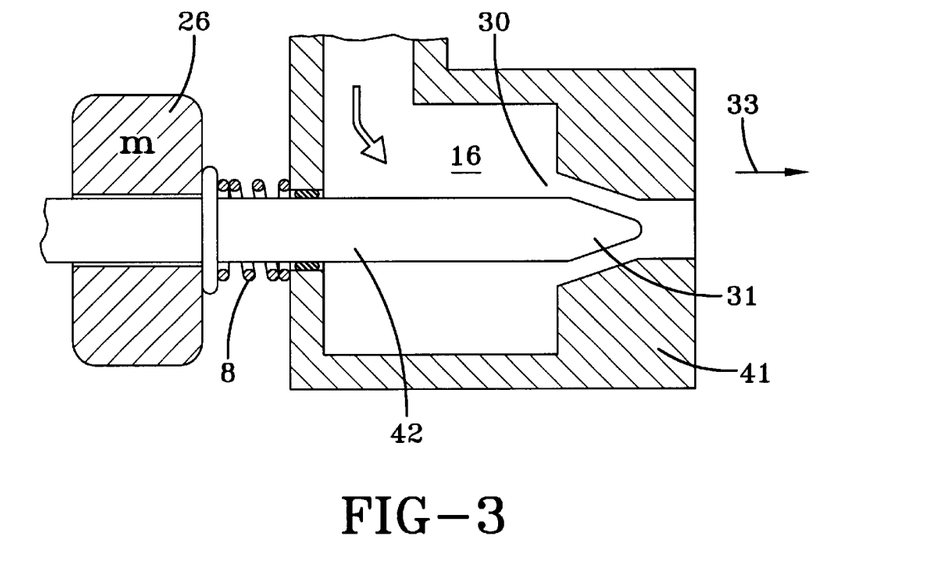
FIGS. 3 to 7 show exemplary embodiments of an adjustment responsive to acceleration of the cross-section of flow of a fluid force-limiter medium used in the exemplary embodiment of FIG. 1.
Figure 4:
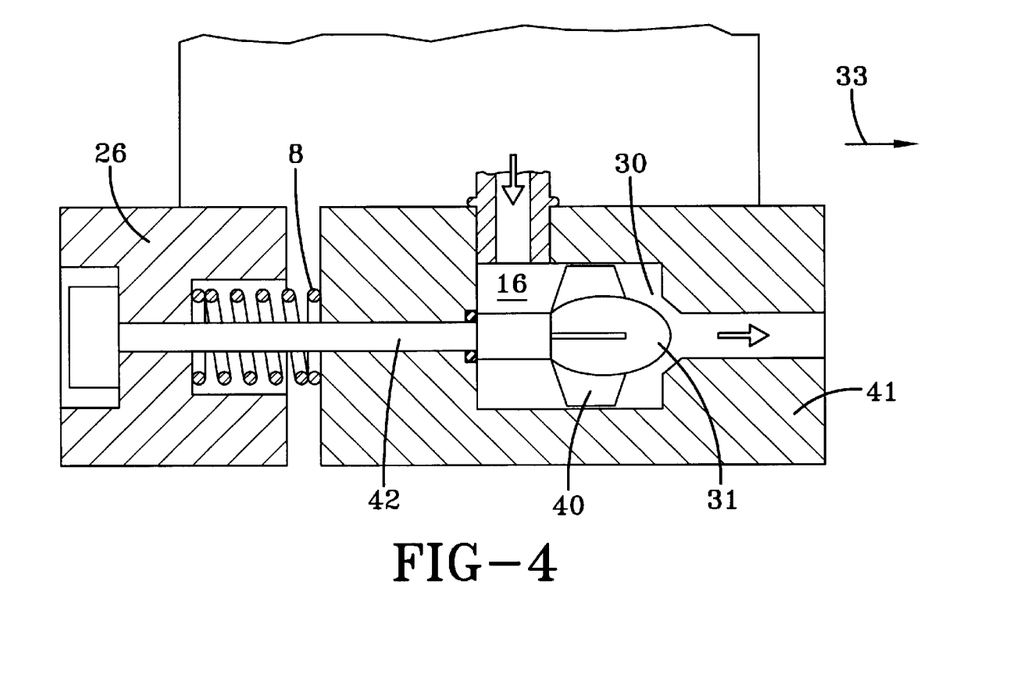

In the exemplary embodiments of FIGS. 3 to 6, servo elements acting as inert masses m are provided. In the exemplary embodiments of FIGS. 3 to 6, for the purpose of adjusting the cross-sections of flow these servo elements are acted upon by a restoring force that is provided by a restoring spring 8. In the exemplary embodiments of FIGS. 3 and 4, servo elements 26 are acted upon by the force of the restoring spring 8 in opposition to an acceleration force acting in the direction indicated by the arrow 33. In the event of an acceleration force in the direction indicated by the arrow 33, corresponding to the direction of travel, which overcomes the restoring force of the spring 8, as a result of its inert mass the servo element 26 is moved to the right as seen in FIGS. 3 and 4. This means that a conically tapering cross-section adjusting part 31 which is connected thereto is pushed into a conically narrowing channel 30 in the flow path of the force-limiter medium 16 transported by the displacement device 4 in a housing 41. The greater the acceleration, the more the cross-section of flow is narrowed in the channel 30. In the exemplary embodiment of FIG. 4, furthermore a rotor 40 is provided in the channel 30 and consumes energy by its rotation, which is caused by the flowing medium 16. The rotor 40 may be arranged such that it is rotatable about or such that it is on the cross-section adjusting part 31.

Figure 5:
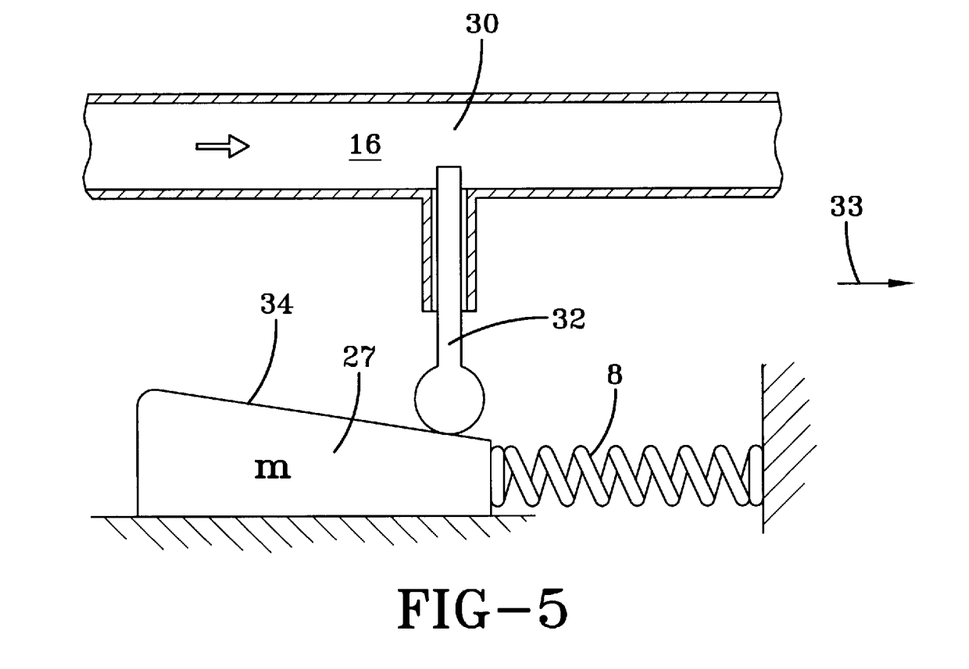

In the exemplary embodiment illustrated in FIG. 5, a servo element 27 has an oblique servo ramp 34. In the event of an acceleration force in the direction of indicated by the arrow 33 exceeding the restoring force of the restoring spring 8, the servo element 27 is moved to the right as seen in FIG. 5 as a result of its inert mass and a cross-section adjusting part 32 is pushed into the channel 30 to narrow the cross-section of flow.

Figure 6:
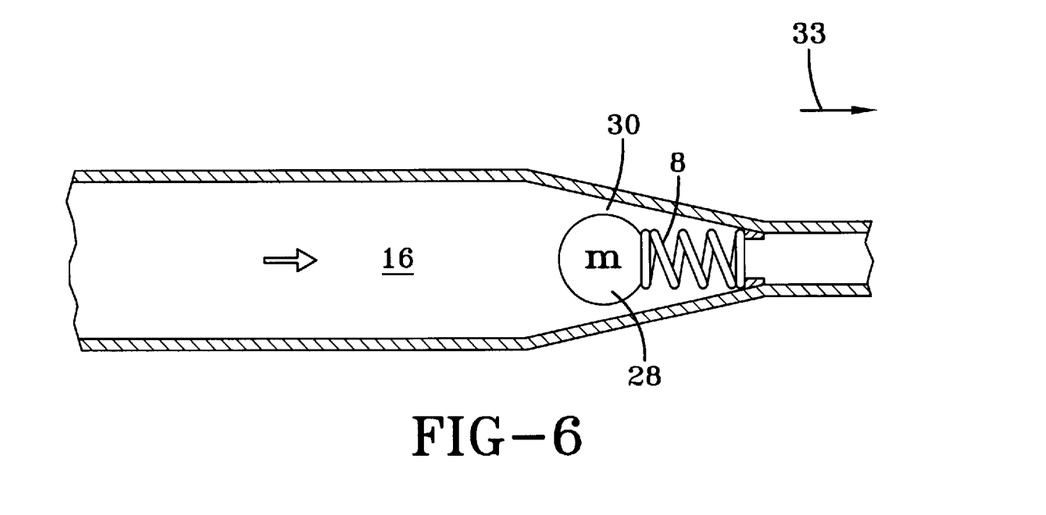

In the exemplary embodiment illustrated in FIG. 6, the servo element 28 is of spherical construction. In the event of an acceleration force acting in the direction indicated by of the arrow 33, which exceeds the restoring force of the restoring spring 8, as a result of its inert mass m the servo element 28, which at the same time acts as the cross-section adjusting part, is moved into the conically narrowing channel 30 through which the force-limiter medium 16 is transported by the displacement device 4.

Figure 7:
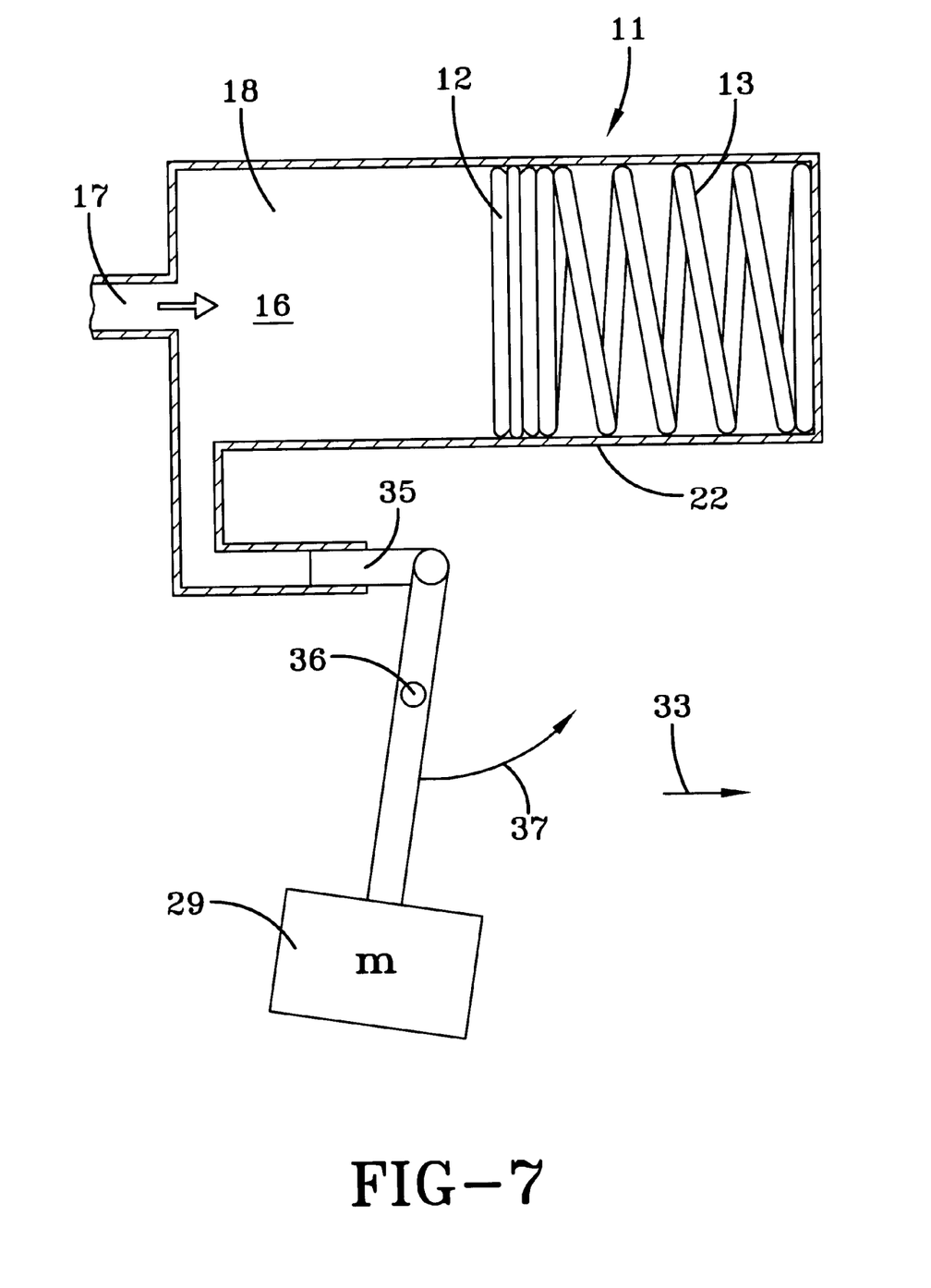

In the exemplary embodiment illustrated in FIG. 7, in the event of an acceleration force acting in the direction indicated by the arrow 33, a servo element 29 that is a pendulum is pivoted with the pendulum mass m in the direction indicated by the arrow 37 about the pendulum axis 36. As a result, a plunger 35 connected to the upper end is displaced in opposition to the direction of the arrow 37, with the result that the volume of the collecting space 18 is made smaller. As a result, the counter-force which acts in opposition to the direction of flow of the force-limiter medium 16 transported by the displacement device 4 is increased as a function of acceleration.

In the exemplary embodiments illustrated in FIGS. 3 to 7, the flow rate or transportation rate of the force-limiter medium 16 from the reservoir space 38 in the cylinder 21 into the collecting space 18 is adjusted automatically as a function of the severity of the crash by narrowing the cross-section of the flow path in a manner responsive to inertia or by reducing the volume of the collecting space 18 acting as a counter-pressure space. Thus, the rate of withdrawing the strap of the seat belt webbing 2 from the belt reel 1 is also adjusted accordingly on the forward displacement of the vehicle occupant affected by the crash and wearing the seat belt.

In accordance with a further aspect of the present invention a hydraulic system has an adjustable flow resistance or adjustable flow rate or the hydraulic system discussed above, forming the force limiter, may also be used to lock the belt reel of the seat belt retractor. For this purpose, a flow barrier is made in the hydraulic system that allows movement of the belt webbing when a minimum pressure is exceeded. When the hydraulic system is blocked, locking of the belt reel is supported at the blocked hydraulic system. This support is provided at least on one side of the seat belt retractor frame. When a minimum pressure is exceeded, a force-limiting movement of the belt reel is permitted, as discussed above, and the flow resistance or the rate (transported volume per unit time) of the force-limiter medium is adjusted accordingly. In each of the exemplary embodiments of FIGS. 8 to 10 an element around which there is flow is arranged in the flow path of the force-limiter medium 16 transported by the displacement device 4. The elements around which there is flow are arranged to be movable in the flow path or in the channel 30 in opposition to the restoring force of a restoring spring 9.

Figure 8:
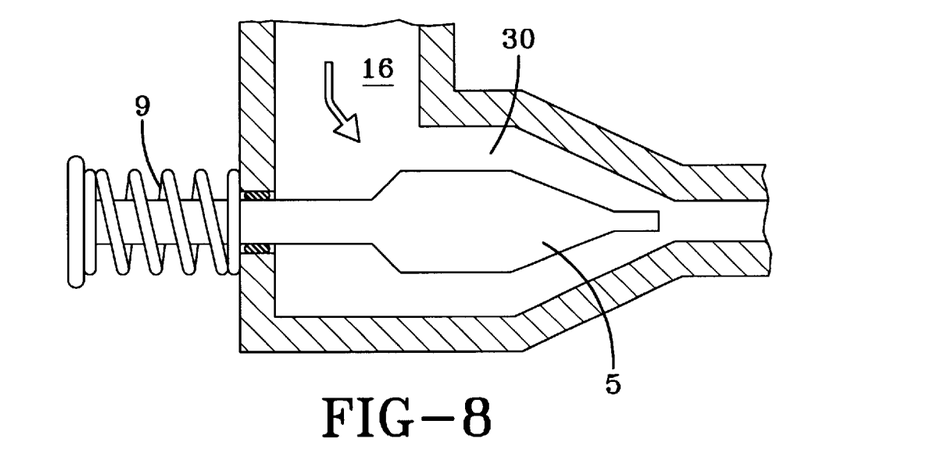
FIGS. 8 to 10 show exemplary embodiments of adjustment devices responsive to mass flow for the cross-section of flow of the fluid force-limiter medium used in the exemplary embodiment of FIG. 1.
Figure 9:
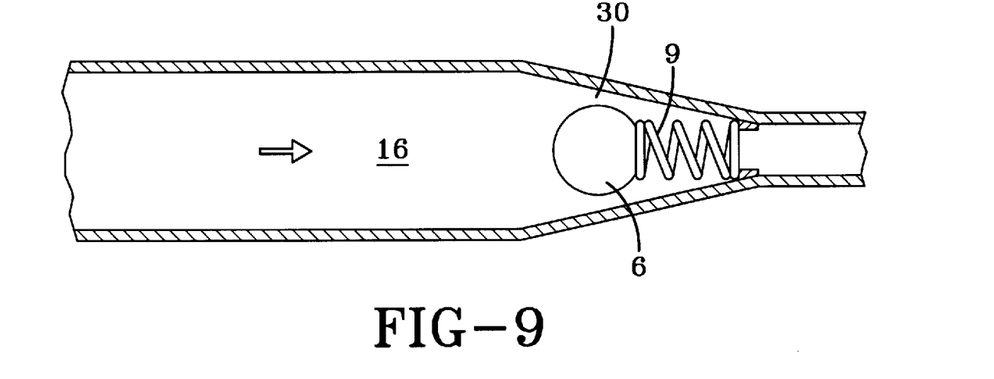
Figure 10:
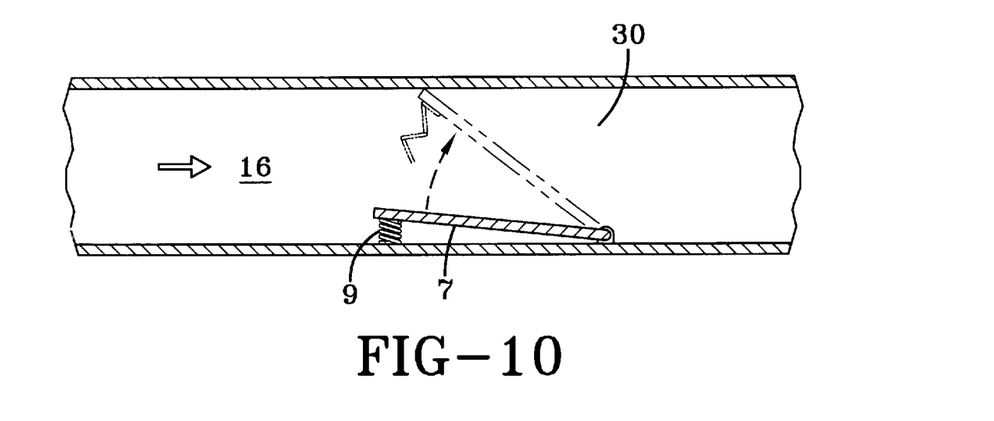

In the exemplary embodiment illustrated in FIG. 8, an element 5 around which there is flow has at its rear side a conical shape which can be moved in opposition to the force of the restoring spring 9 into the conically narrowing part of the channel 30. This movement is generated when the pressure difference between the side of flow impact and the rear side of the element 5 around which there is flow exceeds the restoring force of the spring 9. This pressure difference is substantially proportional to the square of the flow rate of the transported force-limiter medium 16. In the exemplary embodiment illustrated in FIG. 9, the element 6 around which there is flow is a sphere which is movable in opposition to the restoring force of the spring 9 into the conically narrowing part of the channel 30. In the exemplary embodiment illustrated in FIG. 10, the element 7 around which there is flow is a flapper valve which may be pivoted in opposition to the restoring force of the spring 9 as a function of the flow rate of the force-limiter medium 16, into the position in the channel 30 shown in dashed lines.

Furthermore, in order to adjust the force-limiting action, a viscosity adjustment device 25 may be provided which is preferably triggered by the electronic evaluation unit 24, as illustrated in FIG. 1. The viscosity adjustment device 25 acts on the force-limiter medium 16 from the outside. This action may take place in the reservoir space 38 in which the displacement device 4 acts directly on the force-limiter medium 16. The viscosity adjustment device 25 may, however, be arranged at any other point along the transport path 17 between the reservoir space 38 and the collecting space 18.

A force-limiter medium 16 suitable for this is an electro- and/or magneto-rheological fluid. By applying an electrical or magnetic field with the aid of the viscosity adjustment device 25 the viscosity of the force-limiter medium 16 is adjusted as a function of the measurement data relating to a crash and evaluated in the electronic evaluation unit 24. As a result of this, it is possible for the flow resistance and the flow rate of the force-limiter medium 16 to be adjusted to the desired value without additional valves or valve controls, on displacement by the displacement device 4.

In the exemplary embodiments described above, the flowable force-limiter medium 16 is transported through the hydraulic system of the load limiter 3 by the displacement device 4. However, it is also possible for the displacement device 4 to be moved by the flowable force-limiter medium 16 which is at rest in the hydraulic system of the load limiter 3. For this purpose, one or more valves controllable by the electronic evaluation unit 24 may be provided in the displacement device 4. As a result of this valve control, the flow resistance for the force-limiter medium 16 guided through the moving displacement device 4 or the volume guided through per unit time may be adjusted. When an electro- and/or magneto-rheological fluid is the force-limiter medium 16, no valve control of this kind is necessary. By adjusting the viscosity of the force-limiter medium 16, the desired adjustment of the flow resistance is similarly achieved as the medium 16 flows through the moving displacement device 4.

Figure 11:
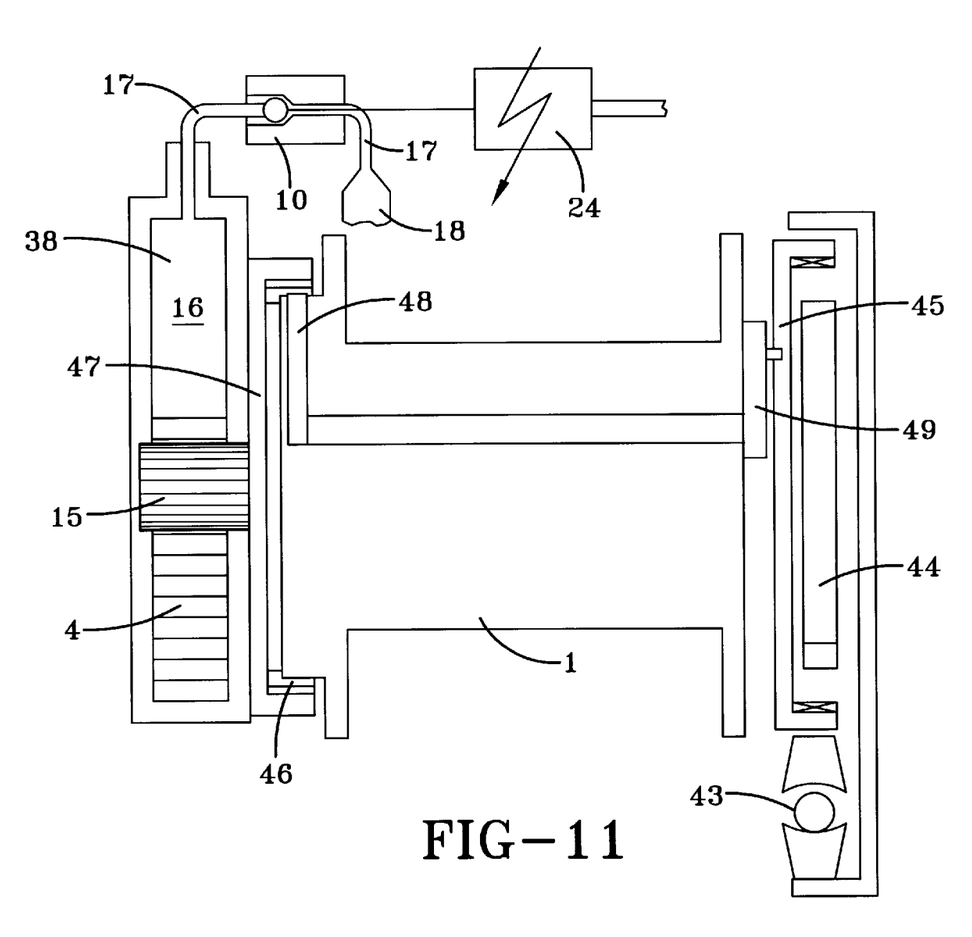
FIG. 11 shows a further construction of the exemplary embodiment.

In the embodiment illustrated in FIG. 11, when the belt reel 1 is locked to prevent further rotation the force required for locking may be supported at the blocked hydraulic system of the force-limiter medium 16. For this purpose, the flow channel for the medium 16 is blocked in the adjustment device 10, constructed for example as a valve device, by a corresponding signal from the evaluation device 24. This may be done if, in the event of excessive acceleration of the vehicle, a control part 45 is pre-blocked by a vehicle sensor 43 of conventional construction and/or a belt webbing sensor 44 of conventional construction. During withdrawal of the belt webbing, an engagement part 48, preferably a latch, is pivoted into the blocking position, in which the engagement part 48 engages in a toothed ring 46 of a toothed ring carrier 47. The engagement part 48 is for this purpose rigidly connected to an entrainer engaging in the control part 45.

The toothed ring carrier is non-rotatably connected to the pinion 15 that meshes with the displacement device 4. Because of the incompressibility of the medium 16 and because of the closed hydraulic system, the displacement device 4 and the pinion 15 are supported non-movably at the closed hydraulic system. The toothed ring carrier 47 and the toothed ring 46 are also supported non-movably at the hydraulic system. The belt reel 1 is thus blocked from further rotation because of the engagement part 48 engaging in the toothed ring 46. When a certain belt withdrawal force is exceeded, the blocked transport of the medium 16 may be released by the adjustment device 10, in which case the flow resistance or the volume of medium 16 transported per unit time is adjusted, as discussed above, in order to obtain a limited restraining force.

While there has been described in connection with the exemplary embodiments of the present invention, it will be obvious to those skilled in the art that various changes and modifications may be made therein without departing from the invention, and it is aimed, therefore, to cover in the appended claim all such changes and modifications as fall within the true spirit and scope of the invention.

We claim:

1. A seat belt retractor comprising a belt reel and a load limiter that has a flowable load-limiter medium which is transported through a flow channel by a displacement device drivable by the belt reel, at an energy consumption related to a crash's severity, wherein a resistance to the flow of the load-limiter medium in the flow channel or the volume of the load-limiter medium transported in the flow channel per unit time is adjustable by adjusting the cross-section of the flow channel using a servo element acting as an inert mass and acted upon by a restoring force.

2. The seat belt retractor of claim 1, wherein the force-limiter medium is transportable by the displacement device from a reservoir space into a collecting space of the load limiter.

3. The seat belt retractor of claim 1 wherein the displacement device is movable in the force-limiter medium that is substantially at rest, with at least part of the force-limiter medium being transported by the moving displacement device.

4. The seat belt retractor of claim 1 wherein the cross-section of the flow channel for the transported force-limiter medium is adjustable in a manner responsive to inertia.

5. The seat belt retractor of claim 2 wherein the cross-section of the flow channel for the transported force-limiter medium is adjustable in a manner responsive to inertia.

6. The seat belt retractor of claim 3 wherein the cross-section of the flow channel for the transported force-limiter medium is adjustable in a manner responsive to inertia.

7. The seat belt retractor of claim 1 wherein the servo element is movable in a direction of travel.

8. The seat belt retractor of claim 2 wherein the servo element is movable in a direction of travel.

9. The seat belt retractor of claim 3 wherein the servo element is movable in a direction of travel.

10. The seat belt retractor of claim 4 wherein the servo element is movable in a direction of travel.

11. The seat belt retractor of claim 7 wherein the restoring force is a spring.

12. The seat belt retractor of claim 1 wherein the viscosity of the force-limiter medium is adjustable.

13. The seat belt retractor of claim 12 wherein the force-limiter medium is an electro- and/or magneto-rheological fluid having a viscosity that is adjustable by an electrical and/or magnetic field.

14. The seat belt retractor of claim 1 wherein the displacement device is a linearly movable piston.

15. The seat belt retractor of claim 1 wherein the displacement device is a rotor.

16. A seat belt retractor comprising a belt reel and a load limiter that has a flowable load-limiter medium which is transported through a flow channel by a displacement device drivable by the belt reel, at an energy consumption related to a crash's severity, wherein a resistance to the flow of the load-limiter medium in the flow channel or the volume of the load-limiter medium transported in the flow channel per unit time is adjustable, and the flow resistance or the volume transported per unit time is adjustable by counter-force acting over the entire cross-section of the flow channel.

17. A seat belt retractor comprising a belt reel and a load limiter that has a flowable load-limiter medium which is transported through a flow channel by a displacement device drivable by the belt reel, at an energy consumption related to a crash's severity, wherein a resistance to the flow of the load-limiter medium in the flow channel or the volume of the load-limiter medium transported in the flow channel per unit time is adjustable, and the forces occurring when the belt reel is locked are taken up at least partly by a hydraulic system blocked against transport of the force-limiter medium.

18. The seat belt retractor of claim 17 wherein the locking device of the belt reel is supported at the displacement device.

* * * * *